United States Patent [19]

Luine et al.

[11] Patent Number: 4,690,313
[45] Date of Patent: Sep. 1, 1987

[54] BOTTLE MOUNTED ADJUSTABLE LIQUOR DISPENSING DEVICE

[76] Inventors: George J. Luine; John L. Luine, both of 2641 N. Vermont, Los Angeles, Calif. 90027

[21] Appl. No.: 947,436

[22] Filed: Dec. 29, 1986

Related U.S. Application Data

[63] Continuation-in-part of Ser. No. 836,736, Mar. 6, 1986, abandoned.

[51] Int. Cl.[4] .................. G01F 11/26; G01F 11/28
[52] U.S. Cl. ......................... 222/454; 222/438; 222/476; 222/513; 222/537; 222/556
[58] Field of Search .............. 222/454, 434, 438–440, 222/442, 445, 446, 449–452, 476, 487, 511, 513, 514, 109, 522, 524, 526, 523, 537, 525, 556, 505, 507

[56] References Cited

U.S. PATENT DOCUMENTS

| 192,977 | 7/1877 | Covode | 222/451 X |
|---|---|---|---|
| 1,287,141 | 12/1918 | Travis | 222/453 |
| 1,949,400 | 3/1934 | Bailey | 222/514 |
| 2,283,652 | 5/1942 | Schwarzkopf | 222/507 X |
| 2,506,125 | 5/1950 | White | 222/438 X |
| 2,645,388 | 7/1953 | Hester | 222/454 |
| 2,728,490 | 12/1955 | Scannell et al. | 222/505 X |
| 2,808,179 | 10/1957 | Digrado et al. | 222/484 X |
| 3,193,160 | 7/1965 | Veit et al. | 222/109 X |
| 3,419,187 | 12/1968 | Bazarnic | 222/438 X |
| 4,151,934 | 5/1979 | Saeki | 222/440 X |
| 4,226,341 | 10/1980 | Towns et al. | 222/440 |
| 4,314,657 | 2/1982 | Perakis et al. | 222/162 |

FOREIGN PATENT DOCUMENTS 331510 9/1903 France ................. 222/445

Primary Examiner—Joseph J. Rolla
Assistant Examiner—Gregory L. Huson

[57] ABSTRACT

The device consists of a cylindrical body divided into an upper filling chamber and a lower overflow chamber by a moveable wall which increases or decreases the size of the filling chamber and determines the amount of liquor to be dispensed. Once the upper chamber is visually determined to be filled a rearward pumping action of the outer body opens the releasing cap and at the same time shuts off the flow of liquor into the filling chamber. The device is attached by insertion into the neck opening of a bottle.

9 Claims, 7 Drawing Figures

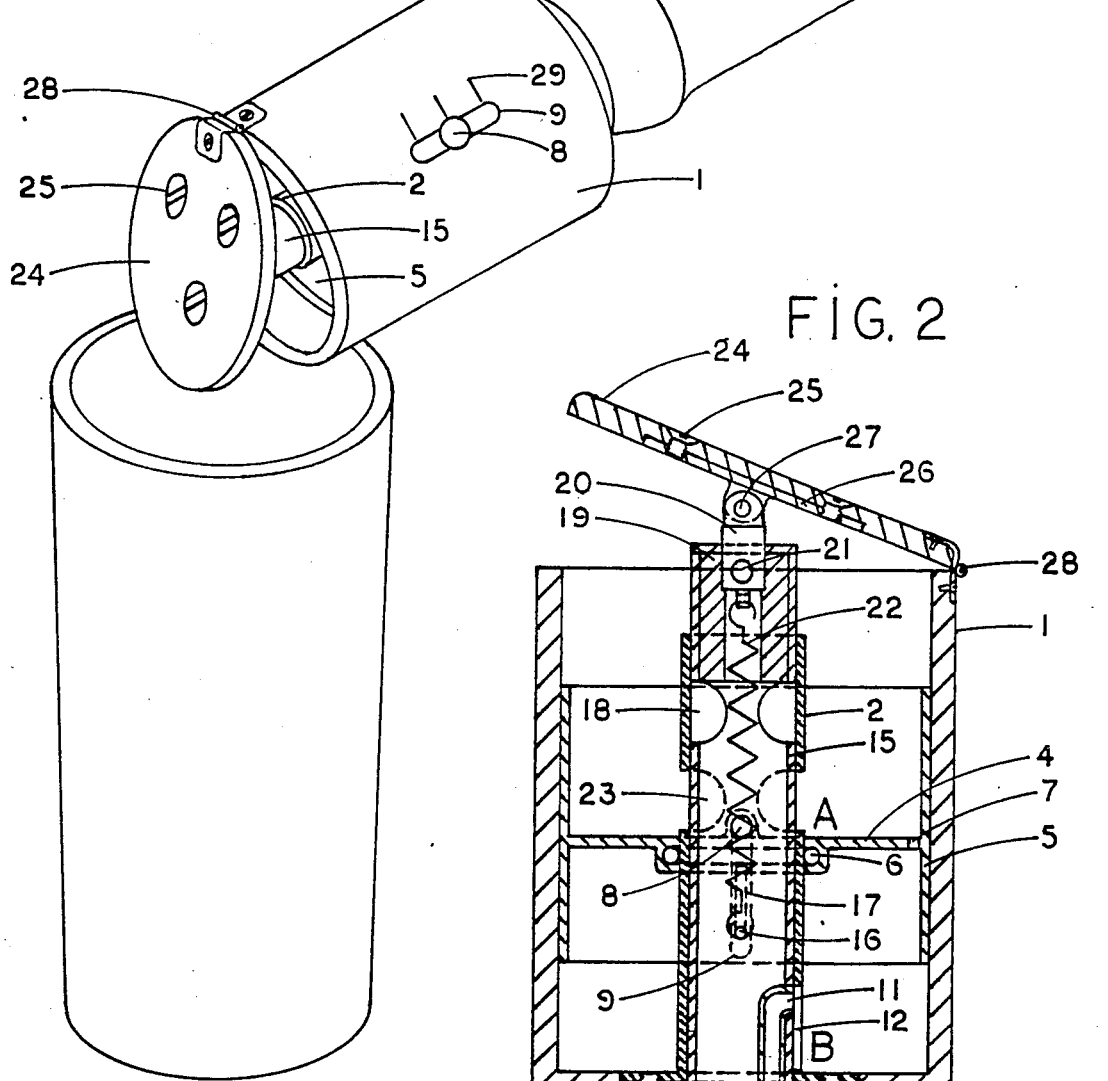

BOTTLE MOUNTED ADJUSTABLE LIQUOR DISPENSING DEVICE

This application is a continuation in part of Ser. No. 836,736, filed 3/6/86 now abandoned.

BACKGROUND OF THE INVENTION

1. Field of the Invention

The invention relates to improving the prior art of liquor dispensing by making the measuring process from bottle to measuring container to glass much simpler and faster.

2. Description of the prior art

In order for a person to pour the desired amounts of alcohol from a bottle he or she must have an assortment of different sized shot-glasses and speed-pours. Once a person has these, pouring from a bottle into the shot-glass and then in turn into the glass is accomplished. This measuring process is inefficient and usually sloppy as to do the process quickly, as most people do in order to save time, means that some of the alcohol is spilled. This makes the entire measuring process wasteful in time, alcohol, and is generally inaccurate. Even by free pouring directly into the glass with a speed-pour the waste and inaccuracy is still present. This invention eliminates the waste, stops the inaccuracy, and does the job much faster.

SUMMARY OF THE INVENTION

This invention relates to improving the prior art of liquor dispensing by combining an adjustable liquid chamber with a release assembly and a pouring element as one device. This device is inserted into the top of the bottle wherefrom it is used and stays until the bottle is emptied. With this device a person has only to set the adjustment, top the bottle to the glass allowing the device to fill with the adjusted amount of liquor, and then releasing this amount directly into the glass. A person can pour from glass to glass quickly only having to raise the bottle momentarily when an adjustment is needed. Otherwise the bottle is always kept in the pouring position for an entire series of pours which are accurate with no spillage. If the device is filled with alcohol and this amount is not released into a glass a person can simply right the bottle and the liquor will quickly drain back into the bottle. The device employs a fast choke free system. It is the object of this invention to improve the prior art of liquor dispensing by eliminating shot-glasses, reducing many motions, saving time and reducing waste.

BRIEF DESCRIPTION OF THE DRAWINGS

FIG. 1: Device as viewed in its working position with releasing member open.

FIG. 2: Sectional of device as viewed from its side with moveable outer cylindrical housing pulled back and attached releasing member open. Adjustment partition viewed in minimum setting position.

DETAILED DESCRIPTION OF THE INVENTION

Figure 3:
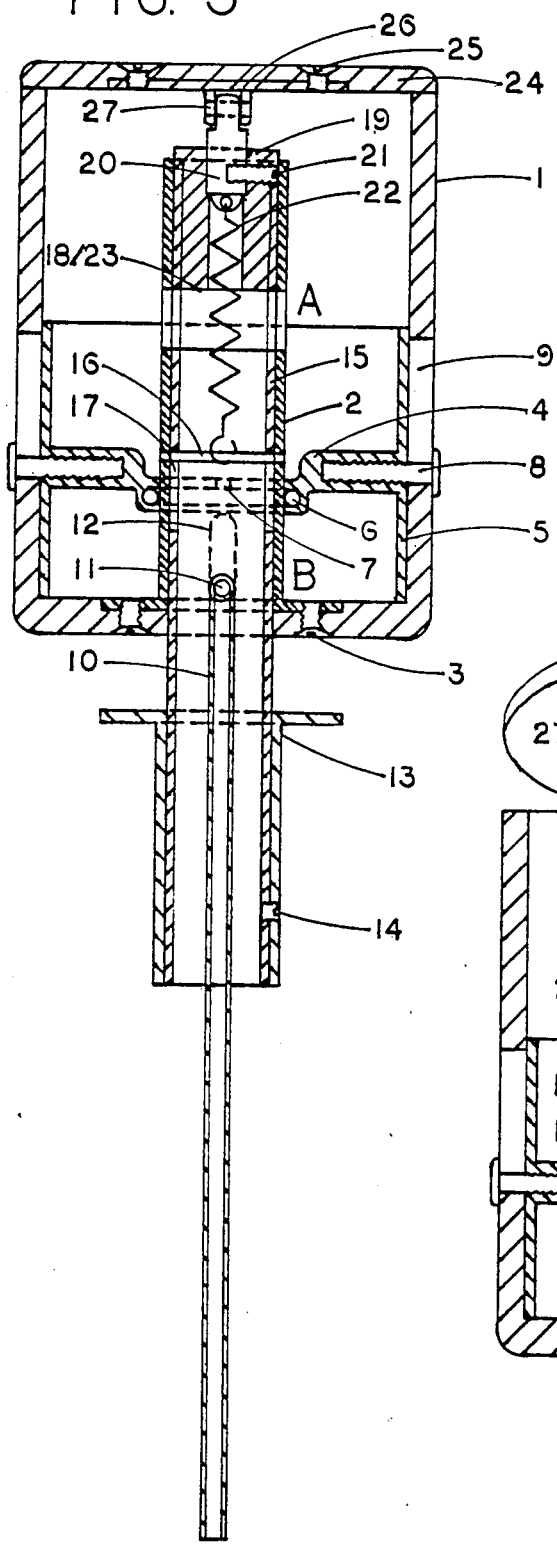
FIG. 3: Sectional of device as viewed from its front with moveable outer cylindrical housing in normal position and attached releasing member closed. Adjustment partition viewed in maximum setting position.

Referring to FIG. 3, the device is held in place on top of the bottle by an insertion flange member 13 affixed to a filling member 15 with a set screw 14.

Referring to FIGS. 1 and 2, the amount of liquor to be dispensed is determined by setting the adjustment partition 4 by moving imbedded adjustment pin members 8 extending through formed elongated adjustment openings 9 in moveable outer cylindrical housing 1 to correct gradient lines 29. The adjustment partition 4 is held in place by friction of an O-ring 6 against slideable shutoff sleeve 2. The outer diameter of the inner cylindrical adjustment sleeve 5 is slideably and sealably compatable as a slip-fit to the inner diameter of the moveable outer cylindrical housing 1.

Figure 6:
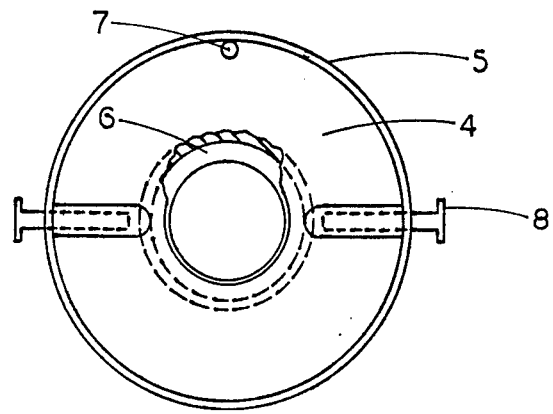
FIG. 6: Cutaway of adjustment partition as viewed from its top with exposed openings and parts.

Referring to FIG. 3, when the bottle is inverted liquor therein flows through stationary filling member 15, through formed filling openings 18 in filling member 15, through formed filling openings 23 in slideable shutoff sleeve 2 and into upper filling chamber A where it is contained by releasing member 24 which forms a closure seal with outer housing 1. Inner diameter of shutoff sleeve 2 and outer diameter of filling member 15 are slideably and sealably coacting. At the same time air in upper filling chamber A is forced through formed air passage opening 7 in adjustment partition 4 (FIG. 6), into the lower overflow chamber B, through formed elongated opening 12 in slideable shutoff sleeve 2 (FIG. 7), through formed air passage opening 11 in air passage member 10, through air passage member 10 and into the bottle replacing the amount of liquor which has flown into chamber A.

Figure 4:
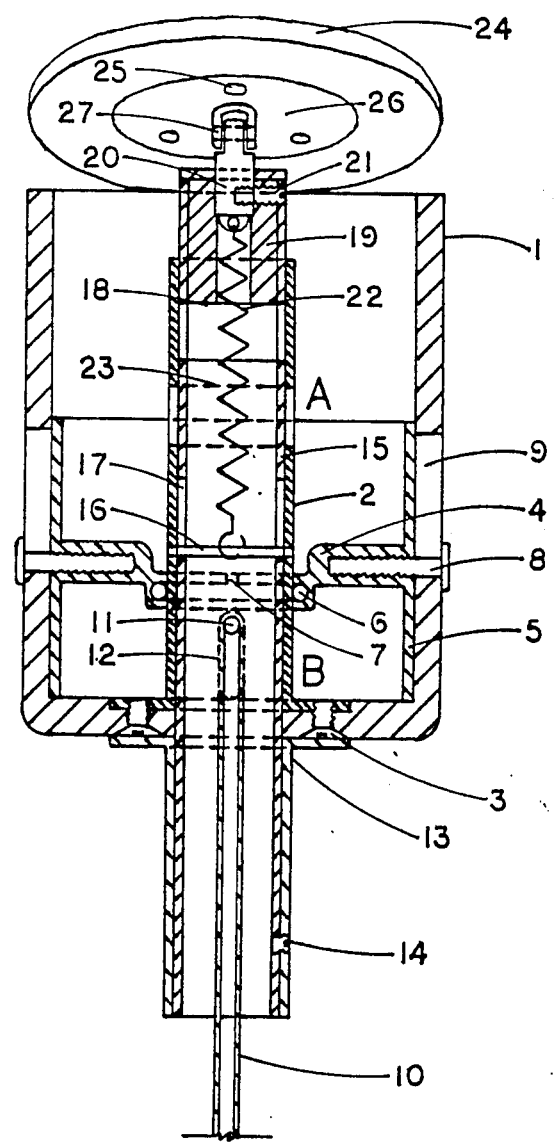
FIG. 4: Sectional of device as viewed from its front with moveable outer cylindrical housing pulled back and attached releasing member open. Adjustment partition viewed in maximum setting position.
Figure 5:
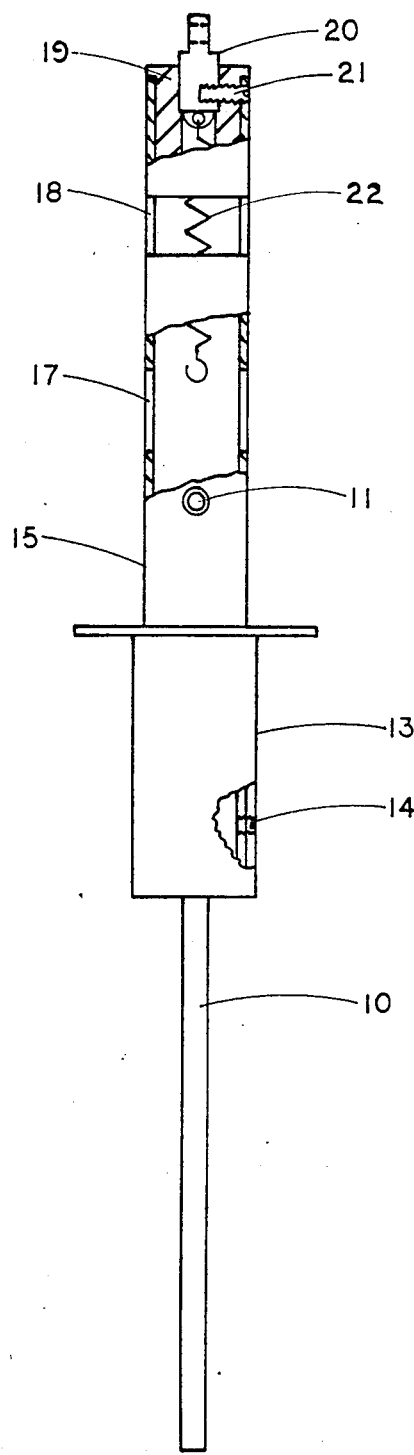
FIG. 5: Cutaway of filling member as viewed from its back with exposed openings and parts.
Figure 7:
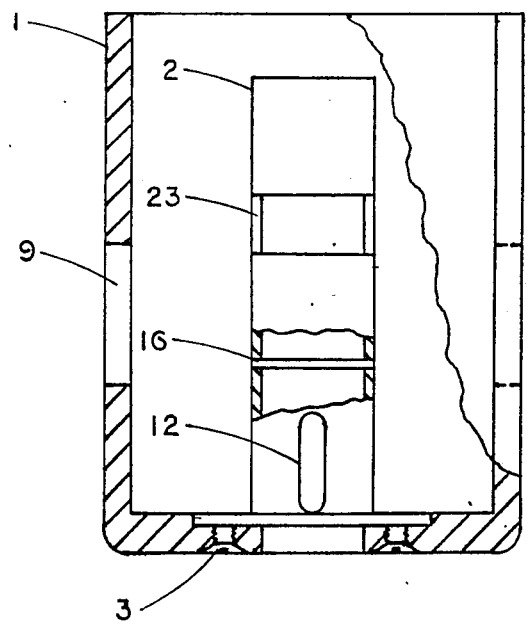
FIG. 7: Cutaway of moveable outer cyindrical housing as viewed from its back with exposed openings and parts.

Referring to FIGS. 2 and 4, as soon as chamber A is filled, visually determined, the next step is to slide the moveable outer cylindrical housing 1 manually rearward towards the bottle. The flanged end of slideable shutoff sleeve 2 is attached to the inner face of housing base around a centrally formed opening therein with screws 3 (FIG. 7). Thus slideable shutoff sleeve 2 moves simultaneously with moveable outer cylindrical housing 1 thereby mis-aligning the formed filling openings 23 in the slideable shutoff sleeve 2 from the formed filling openings 18 in the filling member 15 therein stopping the flow of liquor into chamber A. As the moveable outer cylindrical housing 1 moves rearward the flat circular releasing member 24 attached to upper hinge member 26, which is attached to lower hinge member 20 by hinge pin 27, is opened as it is attached to moveable outer cylindrical housing 1 at its edge by a releasing hinge member 28, thereby releasing the liquor in chamber A. Upon releasing, the moveable outer cylindrical housing 1 is pulled forward by a biasing spring 22 within the filling member 15. The biasing spring 22 is anchored at upper end to lower hinge member 20 and at its lower end to spring retaining pin 16 in slideable shutoff sleeve 2 which travels in formed retaining pin guide openings 17 in filling member 15 (FIG. 5). Spring retaining pin 16 prevents the moveable outer cylindrical housing 1 from rotating around the filling member 15.

Releasing member 24 is attached to upper hinge member 26 by means of screws 25 and is thus prevented from turning as lower hinge member 20 is pinned to filling cap member 19 which is also pinned to filling member 15 with set screw 21.

Referring to FIG. 3, if the liquor in chamber A is not dispensed simply setting the bottle with attached device to upright position will cause liquor to flow back down the filling openings 18 and 23 and back into the bottle. Any liquor left below these openings 18 and 23 will drain through formed air passage opening 7 in adjustment partition 4, into lower overflow chamber B, through formed elongated openings 12 in slideable shutoff sleeve 2, through formed air passage opening 11 in air passage member 10, through air passage member 10 and back into the bottle thus clearing the device of all liquor. The air passage member 10 serves a dual purpose in which it releases the air from filling member chamber A and also as a drainage means for returning liquor to the bottle.

What is claimed is:

1. A bottle mounted liquor dispensing device which comprises: a moveable outer cylindrical housing having a longitudinal axis and a base; a slideable shutoff sleeve with a flange at one end, said shutoff sleeve affixed by its flanged end to an inner face of said base, said axis of said housing coaxial with a longitudinal axis of said sleeve and said base having an opening centrally located; a stationary filling member with an attached insertion flange member at the lower end thereof, said filling member extending upwardly through said centrally formed opening in said base, and through said shutoff sleeve to a releasing member at the upper end of said outer housing; and outer diameter of said filling member slideably and sealably compatible with an inner diameter of said shutoff sleeve as a slip-fit; said filling member having two opposing filling openings one-hundred-and-eighty degrees apart at an upper end thereof, said shutoff sleeve forming two opposing filling openings which align with said filling openings in said filling member to form a liquid passage from the bottle through the filling member and shutoff sleeve when said device is in a rest position; a rearward movement of said housing and shutoff sleeve mis-aligns said filling openings in said filling member and shutoff sleeve to close said liquid passage; an air passage member affixed to an inner wall of said filling member and extending downwardly towards said bottle with an opening at the upper end of said air passage member affixed to a formed opening in said filling member at a juncture of said filling member with said base within said outer housing, said shutoff sleeve having an elongated opening at its flanged end extending upwardly along said filling member, said elongated opening coinciding with said formed opening in said air passage member, and said elongated opening having a length pre-determined by the length of movement of said shutoff sleeve from alignment to mis-alignment of said filling openings allowing an uninterrupted flow of air from within said outer housing into said air passage member; said releasing member attached at its center to an upper hinge member, and a lower hinge member anchored in a filling cap member which closes a terminal end of said filling member, and a hinge pin member connecting said upper and lower hinge members; said releasing member additionally attached at an outer edge to the outer diameter of said housing at an uppermost edge of said housing by a releasing hinge member, said releasing member being bias towards the upper end of said housing by a bias spring within said filling member; an upper end of said spring attached to said lower hinge member, and a lower end of said spring attached to a spring retaining pin affixed to a well at the lower end of said shutoff sleeve in a direction perpendicular to the longitudinal axis of said shutoff sleeve, said pin further extending through two opposing formed elongated openings one-hundred-and-eighty degrees apart in the wall of said filling member, said elongations being parallel to the axis of said filling member and said retaining pin sliding within said elongations as said shutoff sleeve is moved from a closed to an open dispensing position, the length of said formed elongations being determined by the length of movement of said shutoff sleeve relative to said filling member between aligned and mis-aligned positions of said filling openings, the width of said formed elongated openings being determined by the thickness of said retaining pin allowing for a smooth passage of said pin throughout its travel, said spring retaining pin further preventing rotation of the outer housing and shutoff sleeve around said filling member which remains stationary.

2. A bottle mounted liquor dispensing device, as in claim 1, wherein a manual rearward movment of said moveable outer cylindrical housing overcomes the force of said biasing spring to open said attached releasing member.

3. A bottle mounted liquor dispensing device, as in claim 1, wherein a manual rearward movement of said moveable outer cylindrical housing and said shutoff sleeve attached thereto provides a simultaneous release of liquor from within said outer housing while stopping the liquid passage from the bottle into the outer housing.

4. A bottle mounted liquor dispensing device, as in claim 1, wherein the tension of said biasing spring is sufficient to hold said releasing member flat against the upper edge of said outer housing to form a positive closure seal thus preventing leakage.

5. A bottle mounted adjustable liquor dispensing device which comprises: a moveable cylindrical housing having a longitudinal axis and a base; a slideable shutoff sleeve with a flange at one end, said shutoff sleeve affixed by its flanged end to an inner face of said base, said axis of said housing coaxial with a longitudinal axis of said sleeve and said base having an opening centrally located; a stationary filling member with an attached insertion flange member at the lower end thereof, said filling member extending upward through said centrally formed opening in said base, and through said shutoff sleeve to a releasing member at the upper end of said housing; an outer diameter of said filling member slideably and sealably compatible with an inner diameter of said shutoff sleeve as a slip-fit; an inner cylindrical adjustment sleeve with an outer diameter adapted to slideably and sealably coact with the inner diameter of said outer housing as a slip-fit, said inner sleeve having a partition centrally located and extending perpendicular to a longitudinal axis of said inner sleeve, the longitudinal axes of said inner sleeve and said housing being coaxial, said partition including an opening centrally located with a groove around said opening to accommodate an O-ring; said O-ring positioned around said slideable shutoff sleeve and within said groove, said partition dividing said housing into two chambers; an upper filling chamber, and a lower overflow chamber, said upper chamber being that area within said housing and above said partition and external of said shutoff sleeve, and bounded by an inner face of said releasing member, said lower overflow chamber being that area within said housing and below said partition and external of said shutoff sleeve and bounded by said inner face of said base, said partition having an opening near a periphery and adjacent to an inner wall of said adjustment sleeve, said formed opening providing a means of communication between said upper and lower chambers for air passage and liquid overflow, said partition having two opposing imbedded pin members at one-hundred-and-eighty degrees apart each ninety degrees from said air passage opening, said housing forming two opposing elongated openings one-hundred-and-eighty degrees apart with said elongations parallel to said axis of said outer housing; said pin members in said partition extending through the wall of said housing, through said elongated openings, the length of said elongated openings pre-determined by minimum and maximum settings of said partition to vary the volume of the upper chamber by movement of the pins in an axial direction, said shutoff sleeve and said filling member having openings arranged to align and communicating with said upper chamber, said shutoff sleeve displaceable with respect to said filling member to misalign said filling openings and thereby prevent liquid from entering said upper chamber from said filling member, the upper extent of travel of said pins in said elongated openings in said housing is such that said O-ring remains below said filling openings in said shutoff sleeve thereby preventing leakage of liquid past said O-ring and said partition into said lower chamber.

6. A bottle mounted adjustable liquor dispensing device, as in claim 5, wherein said O-ring provides friction against said slideable shutoff sleeve to hold said adjustment partition and the pins therefrom in a pre-selected position within said elongated adjustment openings in said moveable outer cylindrical housing.

7. A bottle mounted adjustable liquor dispensing device, as in claim 5, wherein said imbedded adjustment pin members extending through said formed elongated adjustment openings in said outer cylindrical housing provide a manipulating means for positioning said adjustment partition.

8. A bottle mounted adjustable liquor dispensing device, as in claim 5, wherein placement of said adjustment partition determines the volume of said upper filling chamber which in turn determines amount of liquor to be dispensed.

9. A bottle mounted adjustable liquor dispensing device, as in claim 5, wherein said formed air passage opening in said adjustment partition serves as a drainage means for excess liquor not dispensed from said upper chamber when said adjustment partition is in a lowered maximum volume position.

* * * * *